United States Patent [19]
Tsutsumi

[11] Patent Number: 5,737,477
[45] Date of Patent: Apr. 7, 1998

[54] VIDEO CASSETTE TAPE RECORDING AND REPRODUCING DEVICE

[75] Inventor: Kunihiro Tsutsumi, Kyoto, Japan

[73] Assignee: Rohm Co., Ltd., Kyoto, Japan

[21] Appl. No.: 715,095

[22] Filed: Sep. 17, 1996

[30] Foreign Application Priority Data

Sep. 20, 1995 [JP] Japan ................................. 7-266268

[51] Int. Cl.$^6$ ................................................. H04N 5/91
[52] U.S. Cl. .................................. 386/83; 348/906
[58] Field of Search .............................. 386/83, 46, 1, 386/108; 360/32; 348/460, 906, 734; 455/4.1, 4.2, 186.1, 186.2; H04N 5/91

[56] References Cited

U.S. PATENT DOCUMENTS

| | | | |
|---|---|---|---|
| 5,390,027 | 2/1995 | Henmi et al. | 386/83 |
| 5,499,102 | 3/1996 | Hashimoto | 386/83 |
| 5,526,130 | 6/1996 | Kim | 386/83 |
| 5,552,833 | 9/1996 | Henmi et al. | 386/83 |
| 5,557,421 | 9/1996 | Kurita | 386/83 |

*Primary Examiner*—Robert Chevalier
*Attorney, Agent, or Firm*—Fay, Sharpe, Beall, Fagan, Minnich & McKee

[57] ABSTRACT

In a video cassette tape recording and reproducing device including a reserved time detecting unit which periodically detects either coming of a reserved time or coming of a time slightly before the reserved time after a timer controlled video tape recording is reserved; the reserved time, information relating to TV channel and identification information inputted in response to a signal associated with the timer controlled video tape recording reservation are stored in a memory, the identification information is recorded at the head position of a cassette tape loaded in the video cassette tape recording and reproducing device, the reservation time detecting unit is started without turning off a power source switch in the video cassette tape recording and reproducing device, and the identification information recorded on the cassette tape is reproduced when the detection signal from the reservation time detecting unit is received and whether or not the reproduced identification information coincides with the identification information stored in the memory is detected, and when a coincidence detection signal is received based on the coincidence detection the reserved timer controlled video tape recording is initiated.

11 Claims, 4 Drawing Sheets

FIG.4(a)

| RESER-VATION NO. | DATE | START TIME | AM/PM | END TIME | CHAN-NEL | MODE | ID NO. |
|---|---|---|---|---|---|---|---|
| 1 | 1 10 | 10:10 | AM | 11:12 | 1 | 3 | 001 |
| 2 | 1 10 | 12:30 | AM | 01:30 | 4 | 1 | 002 |
|   |   |   |   |   |   |   |   |

| POWER SOURCE | RESER-VATION | REPRO-DUCING | VIDEO RECOR-DING | REWIN-DING | FORWAR-DING MODE |   |
|---|---|---|---|---|---|---|
| "1" | "0" | "1" | "0" | "1" |   |   |

21

VIDEO CASSETTE TAPE RECORDING AND REPRODUCING DEVICE

BACKGROUND OF THE INVENTION

1. Field of the Invention

The present invention relates to a video cassette tape recording and reproducing device (VCR) and, more specifically, relates to a VCR which unnecessitates a main power source therefor to be brought about into the interrupt condition when a video tape recording is reserved as well as prevents from video tape recording on another video cassette tape from which a reproduction is performed immediately before.

2. Background Art

In a conventional VCR, when a timer controlled video tape recording is reserved, a main power source switch (hereinbelow simply called as power source switch) therefor is generally interrupted automatically and the VCR is placed in a timer monitoring mode under a stand-by condition. In this instance the VCR can not be used until the timer set is released.

A VCR is recently provided with a character superimposed function in which information with regard to operations of the VCR is displayed on a screen of a TV receiver to which the VCR is connected. When reserving a timer controlled video tape recording in such type of VCR, information such as relating to timer reservation of video tape recording and information necessary for a timer controlled video tape recording are displayed on the TV screen, and after the setting of the timer controlled video tape recording is completed, a message indicating the turning "OFF" of the power sorce is displayed on the screen for a predetermined time interval. However, this type of the conventional VCR can not be placed in a timer reserved video tape recording mode unless the power source of the VCR is turned OFF.

Thus, when the power source switch is in ON condition, the timer reserved video tape recording can not be performed. Of cource, the device can not enter into a timer reserved video tape recording when performing reproducing. Moreover, in case that after reserving a timer controlled video tape recording, the timer setting is released and a reproduction of another video cassette tape (hereinbelow, simply called as cassette tape) is performed, if a timer setting is forgotten after the reproduction, the timer controlled video tape recording can not be performed, because the power source of the VCR is not turned OFF. Further, after a timer controlled video tape recording is set, another cassette tape is reproduced and then after completing the reproduction, the power source is turned off, the timer controlled video tape recording is performed on the very other cassette tape from which the production is performed immediately before.

SUMMARY OF THE INVENTION

An object of the present invention is to resolve such problems contained in the conventional art and to provide a VCR which permits reserving a timer controlled video tape recording without necessitating to turn off the power source.

Another object of the present invention is to provide a VCR which prevents during a timer controlled video tape recording from video tape recording on another cassette tape from which a reproduction is immediately before performed.

A VCR according to the present invention which achieves the above objects, is characterized in that, in the VCR including a reserved time detecting means which periodically detects either coming of a reserved time or coming of a time slightly before the reserved time after a timer controlled video tape recording is reserved, the reserved time, information relating to TV channel and identification information inputted in response to a signal associated with the timer controlled video tape recording reservation are stored in a memory, the identification information is recorded at the head position of a cassette tape loaded in the VCR, the reservation time detecting means is started without turning off a power source switch in the VCR, and the identification information recorded on the cassette tape is reproduced when the detection signal from the reservation time detecting means is received and whether or not the reproduced identification information coincides with the identification information stored in the memory is detected, and when a coincidence detection signal is received based on the coincidence detection the reserved timer controlled video tape recording is initiated.

As will be understood from the above, when the timer controlled video tape recording reservation is set, the reservation time detecting means which detects the reservation time is started without putting the power source into the OFF condition. Thereby, the conventional fixed relation between the power source OFF and the timer controlled video tape recording reservation is separated. In order to prevent a video tape recording on a cassette tape loaded in the VCR without rules due to the separation of the fixed relationship between the power source OFF condition and the timer controlled video tape recording reservation, a further cassette tape loaded is rewound and an identification information is stored at the head position on the cassette tape, thereby when performing a video tape recording at the time when the reserved time comes, the video tape recording is started after detecting coincidence between the identification information stored on the cassette tape and the identification information stored in the memory.

With the above measure, in response to the arrival of a reserved time a video tape recording can be started without turning OFF the power source for the VCR.

As a result, even when a timer controlled video tape recording is reserved, the VCR can be used freely without necessitating of releasing of the timer setting.

In addition to the above measure, when reserved time comes when the VCR is performing reproduction including fast forward reproduction, the present invention outputs a message, displays the same on a monitor and urges to enter into a state which permits the video tape recording. At that instance when the power source enters in an OFF state after displaying the message or a key associated with a predetermined video tape recording is inputted, the video tape recording is started after detecting coincidence of the identification information recorded at the head position of the cassette tape loaded. With such measure, the timer reversed video tape recording is never forgotten even during the reproduction.

In the above instance, when a reserved time comes and the power source for the VCR is in an OFF state, it is sufficient if the VCR enters into the video tape recording after detecting coincidence of the identification information recorded at the head position of the cassette tape loaded for the video tape recording. Further, other than the power source OFF state as above, when assuming a case that the VCR enters into a video tape recording when a reserved time comes and the VCR is not performing reproduction, for example, if the VCR is permitted to enter into a video tape recording after detecting coincidence of the identification information when a reserved time comes and even if the operation of the VCR is in a standstill condition, the VCR can enter into a video tape recording when the power source is turned on and the operation of the VCR is in a standstill condition even if the timer resetting is forgotten.

BRIEF DESCRIPTION OF THE DRAWINGS

FIG. 4(a) is a diagram for explaining a reservation information table and FIG. 4(b) is a diagram for explaining condition flags showing operating conditions of the VCR.

DESCRIPTION OF THE PREFERRED EMBODIMENT

Figure 1:
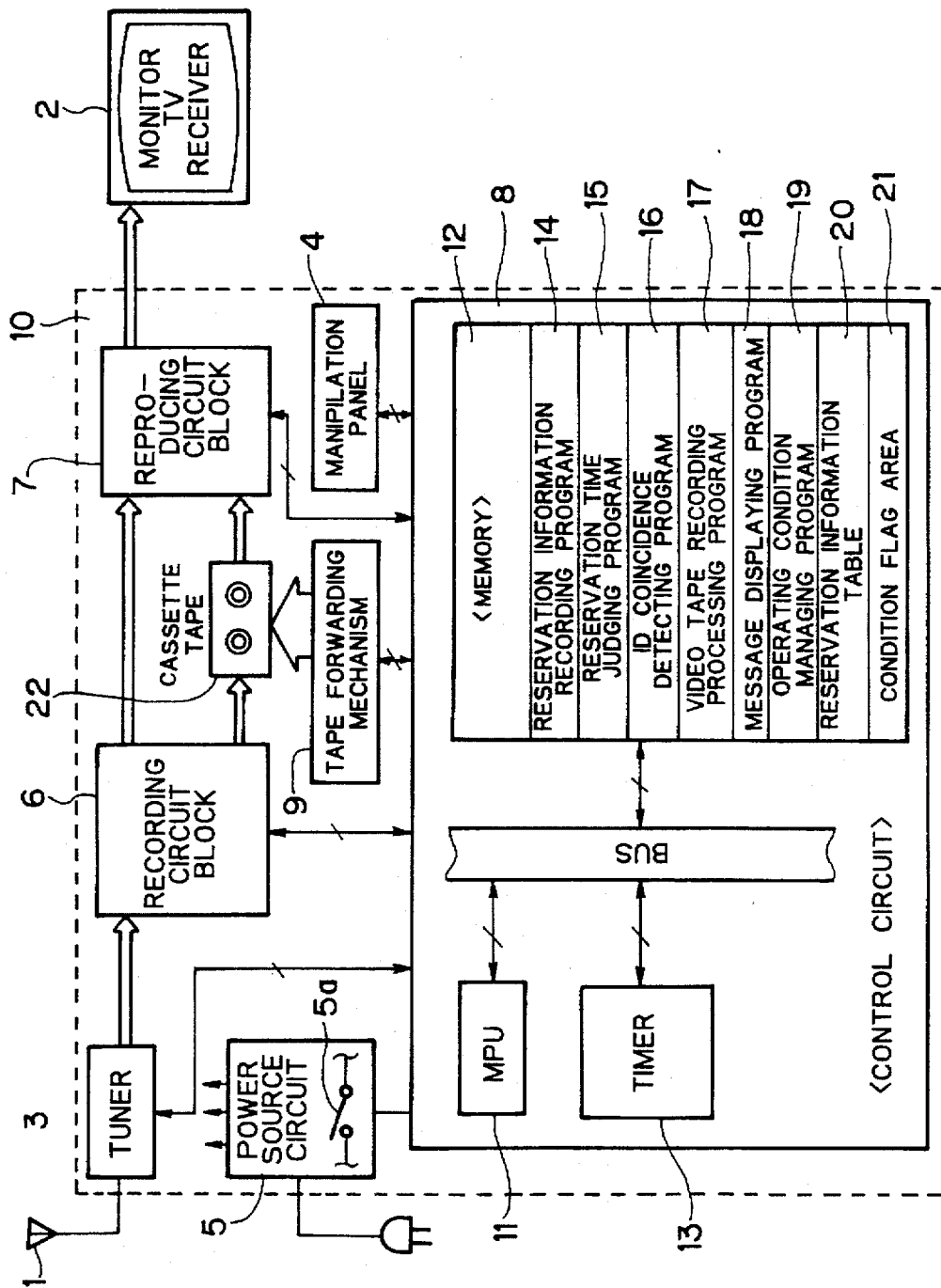
FIG. 1 is a block diagram of one embodiment in which a VCR according to the present invention is applied.

In FIG. 1, numeral 10 is a VCR which receives TV signals from an antenna 1. Numeral 2 is a monitor or a TV receiver which receives reproduced TV signals or video signals from the VCR 10.

The VCR 10 is constituted by a tuner 3, an manipilation panel 4 including a remote controller, a power source circuit 5, a recording circuit block 6, a reproducing circuit block 7, a control circuit 8 and a tape forwarding mechanism 9 which drives a cassette tape loaded. Numeral 22 is a cassette tape loaded in the VCR 10 and in the drawing illustration of details of the mechanical parts of the VCR 10 is omitted.

The control circuit 8 performs such processings as a video tape recording, reproducing, fast forward reproducing, rewinding and a timer reserved video tape recording in response to input signals from the manipulation panel 4. The control circuit 8 is constituted by such as microprocessor (MPU) 11, a memory 12 and a timer 13 which are connected each other via a bus. The memory 12 stores such as a reservation information recording program 14, a reserved time judging program 15, an identification information (ID) coincidence detecting program 16, a video tape recording processing program 17, a message displaying program 18 and an operating condition managing program 19, and is further provided with a reservation information table 20 and a condition flag area 21.

The power source circuit 5 includes a power source switch 5a and is designed to place the VCR 10 in a stand-by condition and to supply electric power to such as to MPU 11 even when the power source switch 5a is turned OFF. Accordingly, even when the power source is in an OFF condition, the MPU 11 executes programs for carrying out predetermined functions such as displaying time and being ready for receiving signals from the controller under the stand-by condition. In other words, even when the power source is in an OFF condition, the VCR 10 is placed in an operating condition of a stand-by condition. In the drawing an illustration of a display device such as LCD in the VCR 10 which displays such as time, manipulation contents and operating conditions is omitted.

The timer 13 is designed to operate even when the power source switch 5a is in an OFF condition and when a timer reservation is set, the MPU 11 executes the reservation time judging program 15 with reference to time of the timer 13 through a periodical interrupting processing. More specifically, the MPU 11 refers to reservation information in the reservation information table 20, judges whether or not the time indicated by the timer 13 corresponds to the video tape recording starting time and further if the VCR 10 is placed in a video tape recording condition, the MPU 11 judges the video tape recording completion time and performs the timer controlled video tape recording completion processing when the video tape recording completion time comes.

Through execution of above mentioned respective programs by the MPU 11, the VCR 10 performs various operations, however in the following explanation, explanation of the executions by the MPU 11 is frequency omitted and operations by the programs are primarily explained.

Now, detection of time coincidence for starting a video tape recording is normally performed at a moment about one minute before the recorded video tape recording starting time. Accordingly, there is a difference of about one minute between the video tape recording time and the actual coincidence detection time. This is because that the mechanical system of the VCR 10 requires at most about one minute to enter into a steady state video tape recording operation after the VCR 10 is set under the video tape recording condition.

The operating condition managing program 19 stores in the condition flag area 21 of the memory 12 information of operating conditions such as whether or not reproducing including fast forward reproducing, video tape recording, rewinding and timer reservation video tape recording representing operating conditions of the VCR 10 and whether or not the power source is in ON condition. FIG. 4(b) illustrates the storage condition therein.

The operating condition managing program 19 receives input information from the manipulation pannel 4 or the remote controller and stores flag "1" or flag "0" at the position corresponding to the input information in the condition flag area 21 of the memory 12 (see FIG. 4(b)). For example, when the VCR 10 is placed in a reproducing condition, flag "1" is set at the position of reproduction, and when the reproducing condition is released, the flag is reset. Further, when the VCR 10 is in a video tape recording condition, flag "1" is set at the position of video tape recording and when the video tape recording is released or completed, the flag is reset. In addition, when such as a rewinding and a timer controlled video tape recording reservation are set in response to manipulation, like steps as explained above are performed. Further, an operation standstill representing no operation of the VCR 10 corresponds to a condition where flags associated with reproducing, video tape recording and rewinding are not set and the power source is in ON condition, in that the power source flag is set at "1". Information relating to these conditions is necessitated when the reservation time judging program 15 is required to judge whether or not the VCR 10 is in a standstill condition which will be explained later.

The stopping of tape forwarding is judged based on a signal from a detector which receives rotation signals from a capstan performing tape forwarding and detects stopping of tape forwarding.

The reservation information table 20 provided in the memory 12 is constituted by a memory area wherein reservation number, reservation date, starting time of video tape recording, distinction between AM and PM, completing time of video tape recording, channel number of video tape recording, video tape recording mode such as standard/triple compacted video tape recording and identification number of several digits as shown in FIG. 4(a) are respectively stored.

The reservation information recording program 14 is executed via the MPU 11 by inputting a key of the video tape recording reservation from the manipulation panel 4 or the remote controller. According to the inputted information, the input information in the reservation information table 20 is successively accepted and stored. When recording of all of the necessary information for the reservation from the date through ID number as indicated above is completed, the reservation information program recording program 14 causes the cassette tape 22 loaded to rewind in fast forwarding to the head position therefore. Then the stopping of tape forwarding is detected based on the signal from the above indicated detector which is designed to detect stopping of tape forwarding. Based on the detection, it is assumed that the tape is rewound to the head position thereof, the ID number recorded in the reservation information table 20 is recorded on the tape from the head position. The tape is again rewound to the head position after completing the ID number recording. Thereafter, the reservation information recording program 14 sets flag "1" at the position of reservation in the condition flag area 21, thereby, the VCR 10 is placed in a timer video tape recording reservation condition.

The reservation number in the reservation information table 20 is automatically set depending on the number of reservations and incremented accordingly. The ID number is, for example, stored in a phase variation of a control pulse on a control track of a magnetic tape and alternatively the ID number can be recorded in overlapping manner at a position during vertical fly-back line period of respective frames in synchronizing signals.

When the key of reservation video tape recording is inputted, there sometimes happens that no cassette tape is loaded into the VCR 10. The reservation information recording program 14 judges whether or not a cassette tape is loaded into the VCR 10 upon receipt of interruption of a cassette tape loading detection signal. When it is judged that no cassette tape is loaded, the message displaying program 18 is called to execute the same by the MPU 11. The MPU 11 executes the message displaying program 18 and transmits to the monitor 2 an output signal which causes to display a message on the screen of the monitor 2 urging to load a cassette tape into the VCR 10 for a predetermined period. The display of this messages is ended when a cassette tape is loaded into the VCR 10, thereafter the operation moves to the processing of the writing-in of the ID number. Further, when no cassette tape is loaded after passing the predetermined time period, the MPU 11 stops the execution of the reservation information recording program 14. Thereby, the prior reservation operation in the VCR 10 is cancelled at this moment. Accordingly, the reservation flag is not set.

Now, when the reservation flag is set at "1", in other words, the timer is in a set condition, the MPU 11 periodically executes the reservation time judging program 12. Thus, the MPU 11 detects arrival of the video tape recording starting time and the video tape recording completing time with reference to flags in the condition flag area 21. When it is detected with reference to the flags in the condition flag area 21 no video tape recording condition, only the arrival of the video tape recording starting time is detected. The time setting is effected by a unit of one minute such that the coincidence of time is determined by a unit of one minute.

The MPU 11 at first successively refers to the video tape recording times in the reservation information table 20 according to the order of the reservation number, judges whether or not the present time including date from the timer 13 is in a predetermined time range prior to the video tape recording starting time and performs coincidence detection of these times. The predetermined time range in this instance corresponds to about one minute prior to the video tape recording time as explained above which is required to bring about the mechanical system of the VCR 10 into a steady state video tape recording condition.

When, the coincidence is detected, the reservation time judgement program 15 performs judgement of operating conditions of the VCR 10 with reference to flags in the condition flag area 21. The operating conditions judged at this instance include whether or not the power source is OFF (whether or not the power source switch 5a is in a turned off condition, or the power source switch 5a is being shifted into a turned off condition), whether the operation of the VCR 10 is in a standstill condition or in reproducing and whether or not the VCR 10 is in a video tape recording condition.

Further, when the coincidence is detected and when a predetermined control signal commanding the video tape recording starting is inputted in the VCR 10, the reservation time judging program 15 accepts the control signal via an interruption and calls for the ID coincidence detection program 16 to cause to execute the same by the MPU 11.

When the reference to the flags in the condition flag area 21 after the coincidence detection reveals that the VCR 10 is performing a reproduction, the reservation time judging program 15 calls for the message displaying program 18 and causes the MPU 11 to execute the same. In this instance, the MPU 11 transmits to the monitor 2 an output signal displaying a message, for example, "Video Tape Recording Start ?" with regard to the timer controlled video tape recording reservation and refers to the condition flag area 21 for a predetermined period. Thereafter,-when the condition flag area 21 takes the following conditions, the ID coincidence detection program 16 is called for and then executed by the MPU 11.

1. When a reproduction flag is reset (or when the reproducing condition is released).

2. The power source is turned OFF.

Further, when neither the reproducing condition is released, nor the key for video tape recording starting is inputted, nor the power source is turned OFF for a predetermined period, the processing returns to a condition where no coincidence is detected. As a result, the reservation item of which reservation concent is recorded in the reservation information table 20 and of which time coincidence is detected is excluded from judgement objects due to passage of time.

When the reference to the flags in the condition flag area 21 after coincidence detection reveals that the VCR 10 is preforming a video tape recording, the reservation time judging program 15 detects arrival of time of video tape recording completion with reference to the video tape recording completion time and when the time coincidence is detected in the same manner as in above, the video tape recording is ended. This processing is performed in such a manner that the video tape recording completion times in the reservation information table 20 are successively referred to in the order of reservation number, the coincidence detection of the respective video tape recording completion times with the present time including date from the timer 13 is performed and when coincidence is detected, the video tape recording is ended and the corresponding video tape recording reservation information in the reservation information table 20 is reset. For the same reason as above, the setting of the completion time is effected by a unit of one minute and the coincidence is also determined by a unit of one minute. Further, for the same reason as above, the coincidence detection can be performed sometime prior to the completion time in view of the operational delay of the mechanical system of the VCR 10.

The reservation time judging program 15 resets the flag for the video tape recording in the condition flag area 21 when the completion time coincides, and further clears information relating to the completed video tape recording among the information relating to reservations stored in the reservation information table 20. In this instance, when all of the information has been cleared, the reservation flag (timer set) in the condition flag area 21 is also reset.

The MPU 11 executes the reservation time judging program 15 a plurality of times per one minute, and the detection of time coincidence is allowed to be one having a certain time clearance.

A reference to a flag in the condition flag area 21 reveals turning OFF of the power source when the time coincidence is detected, the reservation time judging program 15 calls for the ID coincidence detecting program 16 and causes the MPU 11 to execute the same.

The ID coincidence detecting program 16 rewinds the cassette tape 22 once to the original position, then causes the cassette tape 22 to be reproduced to the position where the ID number is recorded to thereby obtain a signal of the ID number and decode the signal as the ID number. Thereafter, the ID coincidence detecting program 16 compares the ID number corresponding to the video tape recording starting time in the reservation information table 20. When the comparison reveals coincidence, the video tape recording processing 17 is started. When no coincidence is detected, the processing is terminated. Further, in the like manner as in the reservation information recording program 14 the detection whether or not the cassette tape 22 has been rewound to the original position is determined when a signal is received from the detector which is designed to detect stopping of the tape forwarding operation.

When the power source is in OFF condition, the video tape recording processing program 17 turns on the power source and then refers to the reservation information table 20. Thereafter, the video tape recording program 17 causes to generate a signal for tuning the tunner 3 to the reserved channel stored in the channel column, sets the tuner 3 at the designated channel and places the VCR 10 in a condition ready for receiving signals from the designated channel. Thereafter, the video tape recording processing program 17 causes to refer to the video tape recording mode, and if, for example, a triple compacted video tape recording mode is recorded, the video tape recording processing program 17 causes the VCR 10 to set at the triple compacted video tape. recording mode and sets the flag "1" at the position of video tape recording in the condition flag area 21 and thereafter places the VCR 10 in the video tape recording condition.

Now, the above mentioned reservation information recording program 14 is primarily a program wherein data are written in a table and the reservation time judging program 15 is primarily a program wherein time data are compared. The operating condition managing program 19 is primarily a program wherein the condition flags are stored in a memory. VCRs are controlled until now by a microprocessor or a micro controller which executes programs, therefore, the above mentioned respective programs can be easily incorporated therein with reference to respective requirements for the respective programs and the details of the respective programs are merely design matters, therefore detailed explanation thereof is omitted.

Further, the video tape recording processing program 17 and the message displaying program 18 are programs which are already used in conventional VCRs.

Figure 2:
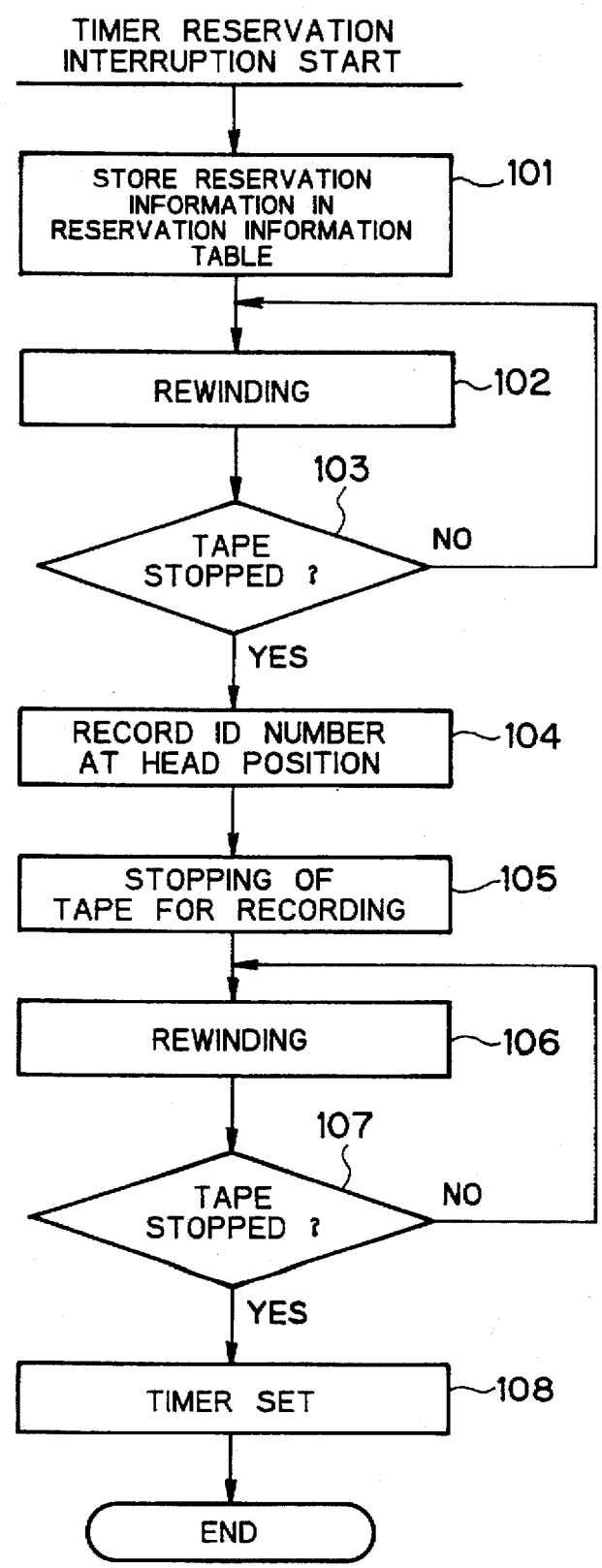
FIG. 2 is a flow chart of processings for timer reservation.
Figure 3:
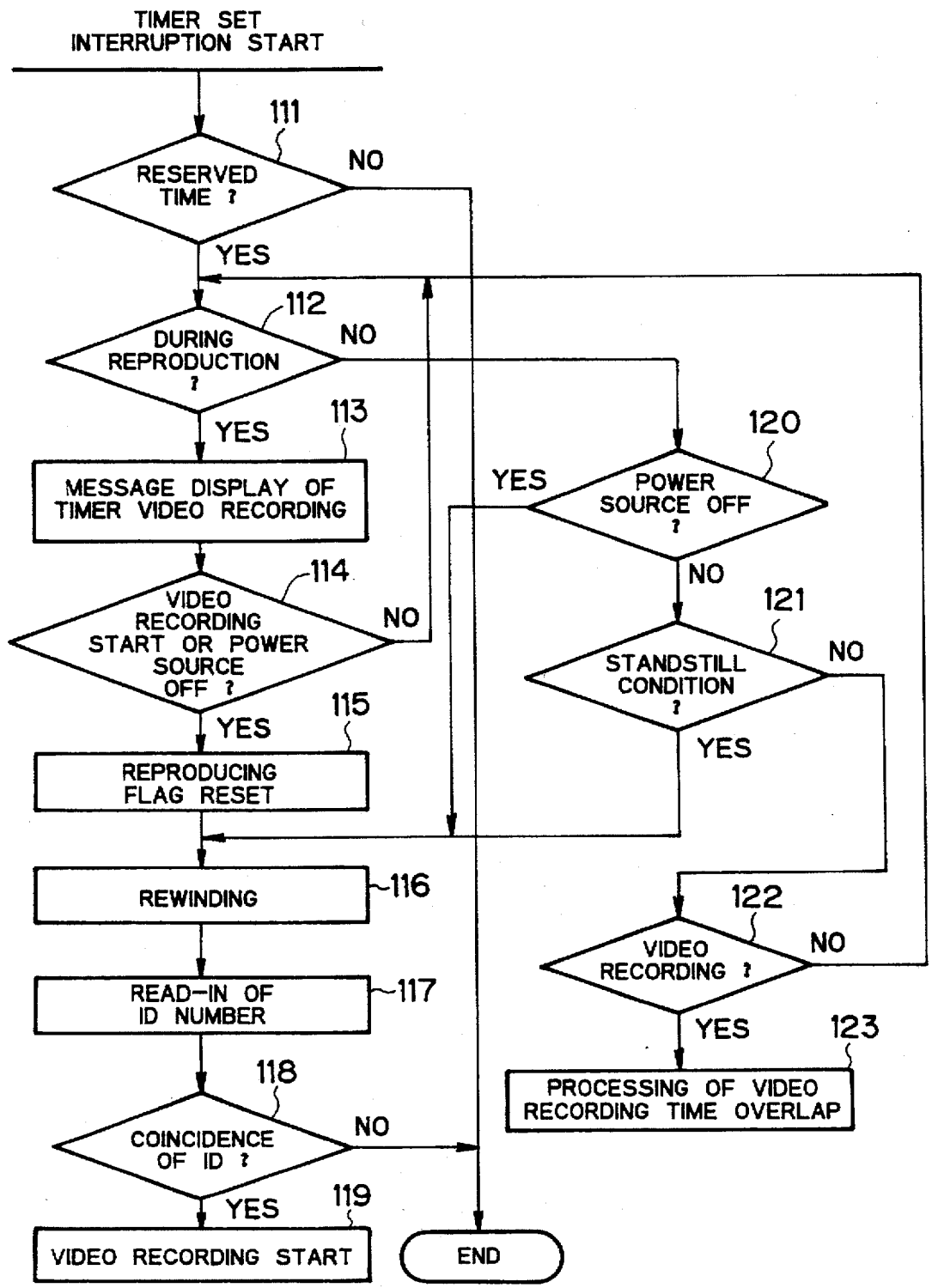
FIG. 3 is a flow chart of video tape recording processings for the timer reservation.

Hereinbelow, a general processing operation with regard to the timer reserved video tape recording is explained with reference to FIGS. 2 and 3.

At first the processings of the timer reservation is explained with reference to FIG. 2. When a button for the timer controlled video tape recording reservation is manipulated, an interruption is effected thereby and the MPU 11 executes the reservation information recording program 14. Thereafter, a predetermined information is at first recorded in the reservation information table 20 (step 101). Subsequently, the MPU 11 rewinds the cassette tape 22 in a fast forwarding (step 102). Thereafter, the MPU 11 judges whether or not the tape forwarding has been stopped (step 103). In this judgement, when the answer is NO, the MPU 11 returns to the processing in step 102, but when the answer is YES, the MPU 11 stores the ID number at the head position of the cassette tape 22 (step 104), stops the tape forwarding after the recording (step 105) and then rewinds the cassette tape 22 (step 106). Thereafter, the MPU 11 again judges whether or not the tape forwarding has been stopped (step 107). In this judgement, when the answer is NO, the MPU 11 returns to the processing in step 106, but when the answer is YES, MPU 11 performs timer setting (step 108). Thereby, the reservation flag in the condition flag area 21 is set at "1" to place in timer set condition. However, at this instance the power source is not placed in OFF condition.

Now, the processing of the timer reserved video tape recording is explained with reference to FIG. 3.

When, the reservation flag is set in the condition flag area 21, the MPU 11 calls for the reservation time judging program 15 via a periodical interruption and executes the same. Thereby, the MPU 11 judges whether or not the reserved time has come when a periodical interruption timing comes (step 111). In this judgement, when the answer is NO, the processing is terminated and the identical judgement is again performed in the subsequent interruption.

In the above judgement, when the answer is YES, the MPU 11 judges with reference to flags in the condition flag area 21 whether or not the VCR 10 is performing reproduction (step 112). In this judgement, when the answer is YES, the MPU 11 calls for the message displaying program 18 and executes the same to display a message "Timer Controlled Video Tape Recording" (step 113). Then, it is judged whether or not a predetermined key relating to such as video tape recording starting and power source OFF is inputted (step 114). In this judgement, when the answer is NO, the MPU 11 returns to the processing in step 112, and when the answer is YES, the flag relating to reproduction in the condition flag area 21 is reset (step 115), and the processing moves to step 116 after releasing the reproducing condition. When the reproducing condition is already released, this processing stands a redundant second processing.

In step 116, the MPU 11 calls for the ID coincidence detecting program 15 and executes the same. Thereby, the cassette tape 22 is rewound to the head position thereof. Then, the ID number is read-in (step 117) and coincidence thereof with the ID number in the reservation information table 20 is detected (step 118). In this judgement, when the answer is YES, the MPU 11 calls for the video tape recording processing program 16 and executes the same. Thereby, the video tape recording is started (step 119). When no coincidence is judged in step 118 and the judgement result is NO, the MPU 11 terminates the processing without performing the video tape recording.

Further, if a cassette tape is initially loaded, the rewinding thereof is already completed, the above rewinding processing in step 116 stands a redundant second processing. The present rewinding is intended to rewind a cassette tape other than the cassette tape for recording loaded in the VCR 10 and to read-out the ID information from the head position thereof.

Further, in the above judgement at step 112, when the answer is NO, it is judged whether or not the power source is in OFF condition (step 120), and when the answer in step 120 is YES, it is judged that the power source is in OFF condition and the processing of the MPU 11 moves to the previous step 116. Further, when the answer in step 120 is NO, the processing of the MPU 11 moves from step 120 to step 121 and judges whether or not the operation of the VCR 10 is in standstill condition which corresponds to the condition where the position of the power source flag in the condition flag area 21 is set at "1" and flags such as for reproduction, video tape recording and rewinding are set at "0".

When the judgement in step 121 indicates YES, namely, when it is judged the operation of the VCR 10 is in standstill condition, the processing of the MPU 11 likely moves to the provious processing in step 116. Contrary, when the judgement in step 121 indicates NO, the processing moves from step 121 to step 122 and judges whether or not a video tape recording is being performed. In the judgement in step 122 when the answer is NO, the processing returns to step 112 and the same processings as indicated above are repeated. On the other hand, in the judgement in step 122 when the answer is YES, the answer indicates that video tape recording times are overlapped, therefore, the processing moves from step 122 to step 123 wherein processings for resolving such overlapping are performed which is one selected from a processing in which the previous video tape recording is stopped and the subsequent reserved video tape recording is started, a processing in which the subsequent video tape recording is not immediately started, but started after the previous video tape recording is completed and a processing in which the subsequent video tape recording is neglected.

As explained in the above, in the present embodiment, the ID number stored such as in the recording track of the control signals for the cassette tape or the vertical fly-back line sections therefor, however, the ID number, of course, can be stored in the image signal tracks.

Further, in digital type cassette tape having a built-in semiconductor memory, the ID information together with the reservation information can be stored in the memory inside the cassette tape in place of the above explained outside memory.

Still further, the reservation table and the condition flag area can be provided in a separate memory other than that storing the respective programs.

I claim:

1. A video cassette tape recording and reproducing device including a reserved time detecting means which periodically detects either coming of a reserved time or coming of a time slightly before the reserved time after a timer controlled video tape recording being reserved comprising:

a reservation information recording means which stores the reserved time, information relating to TV channel and identification information inputted in response to a signal associated with the timer controlled video tape recording reservation in a memory, records the identification information at the head position of a cassette tape loaded in the video cassette tape recording and reproducing device and starts said reservation time detecting means without turning off a power source switch in the video cassette tape recording and reproducing device;

a coincidence detecting means which reproduces the identification information recorded on the cassette tape when the detection signal from said reservation time detecting means is received and detects whether or not the reproduced identification information coincides with the identification information stored in the memory; and a video tape recording means which starts the reserved timer controlled video tape recording when a coincidence detection signal is received from said coincidence detecting means.

2. A video cassette tape recording and reproducing device according to claim 1, wherein said coincidence detecting means determines coincidence between the reproduced identification information and the identification information stored in the memory when the detection signal from said reservation time detecting means is received and either when the power source switch is in a turned off condition, when the power source switch is forced into a turned off condition or when a predetermined control signal commanding starting of video cassette tape recording is inputted in the video cassette tape recording and reproducing device.

3. A video cassette tape recording and reproducing device according to claim 2, further comprising a judging means which judges whether or not the video cassette tape recording and reproducing device is in reproducing condition in response to the detection signal from said reservation time detecting means and a message outputting means which outputs a message indicating starting of video cassette tape recording on a display when said judging means determines a reproducing condition.

4. A video cassette tape recording and reproducing device according to claim 1, wherein said coincidence detecting means determines coincidence between the reproduced identification information and the identification information stored in the memory when the detection signal from said reservation time detecting means is received and either when the power source switch is in a turned off condition, when the power source switch is forced into a turned off condition, when the operation of the video cassette tape recording and reproducing device is in a standstill condition or when a predetermined control signal commanding starting of video cassette tape recording is inputted in the video cassette tape recording and reproducing device.

5. A video cassette tape recording and reproducing device according to claim 2, wherein said memory is provided at the cassette tape and said reservation information recording means reads-out the reservation time, the reservation channel and the identification information from the memory provided at the cassette tape.

6. A video cassette tape recording and reproducing device according to claim 1, further comprising a processor, wherein said reservation information recording means, said coincidence detecting means and said video cassette tape recording means are realized when the corresponding programs thereof stored in the memory are executed by said processor.

7. A video cassette tape recording and reproducing device according to claim 1, wherein said memory includes a table in which the reservation time, the channel information and the identification information are stored according to the reservation order.

8. A video cassette tape recording and reproducing device according to claim 2, wherein said memory includes a storage area in which the effecting of timer reservation, ON condition of the power source, reproducing condition of the video cassette tape recording and reproducing device, video cassette tape recording condition of the video cassette tape recording and reproducing device and tape forwarding condition of the video cassette tape recording and reproducing device are respectively stored in flag setting, and said coincidence detecting means judges either ON condition of the power source, reproducing condition of the video cassette tape recording and reproducing device or the video cassette tape recording condition of the video cassette tape recording and reproducing device with reference to said storage area when the detection signal from said reservation time detecting means is received and determines that the predetermined control signal commanding starting of the video cassette tape recording is inputted into the video cassette tape recording and reproducing device.

9. A video cassette tape recording and reproducing device according to claim 7, further comprising a separate another memory in which the effecting of timer reservation, ON condition of the power source, reproducing condition of the video cassette tape recording and reproducing device, video cassette tape recording condition of the video cassette tape recording and reproducing device and tape forwarding condition of the video cassette tape recording and reproducing device are respectively stored in flag setting, and said table is provided in said separate other memory and said coincidence detecting means judges either ON condition of the power source, reproducing condition of the video cassette tape recording and reproducing device or the video cassette tape recording condition of the video cassette tape recording and reproducing device with reference to said separate other memory when the detection signal from said reservation time detecting means is received and determines that the predetermined control signal commanding starting of the video cassette tape recording is inputted into the video cassette tape recording and reproducing device.

10. A video cassette tape recording and reproducing device according to claim 2, wherein said reservation information recording means and said coincidence detecting means respectively detect rewinding completion of the cassette tape.

11. A video cassette tape recording and reproducing device according to claim 10, wherein said reservation information recording means determines the recording position of the cassette tape at the head position thereof when the cassette tape has been rewound, records the identification information thereat and again rewinds the cassette tape, and said coincidence detecting means reproduces the identification information from the recording position when the cassette tape has been again rewound.

* * * * *